Feb. 10, 1948. E. F. KURTZ Re. 22,973

PROTECTIVE CIRCUIT

Original Filed Sept. 15, 1939 2 Sheets-Sheet 1

Edward F. Kurtz,
Inventor,
Haynes, Koenig and Woof,
Attorneys.

PROTECTIVE CIRCUIT

Original Filed Sept. 15, 1939 2 Sheets-Sheet 2

Edward F. Kurtz,
Inventor,
Haynes, Koenig and Woof,
Attorneys.

Reissued Feb. 10, 1948 Re. 22,973

UNITED STATES PATENT OFFICE 22,973

PROTECTIVE CIRCUIT

Edward F. Kurtz, Attleboro, Mass., assignor to Metals & Controls Corporation, Attleboro, Mass., a corporation of Massachusetts Original No. 2,312,915 dated March 2, 1943, Serial No. 295,039, September 15, 1939. Application for reissue July 7, 1947, Serial No. 759,414

9 Claims. (Cl. 175—294)

This invention relates to protective circuits, and with regard to certain more specific features, to electrical overload protective circuits for energy translating devices such as motors, generators, transformers, electromagnets, and the like.

Among the several objects of the invention may be noted the provision of protective circuits of the class described particularly adapted for use with polyphase energy translating devices, and utilizing as sensitive elements thermally responsive switches, at least two of which are provided in the circuit, which are electrically interconnected but mechanically independent; the provision of circuits of the class described in which only the indicated thermally responsive switches are required (supplementary relays, magnetic switches and the like being unnecessary); the provision of circuits of the class described wherein each of said thermally responsive switches performs a protective function governed by the current in an individual, different supply wire, or phase, but in which the openings of any one such switch disconnects the entire energy translation device from its power supply; the provision of circuits of the class described requiring closing of all of the separate thermally responsive switches in order to energize the energy translating device; and the provision of circuits of the class described which are relatively simple and employ simple and economical devices therein. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a diagram of a circuit embodying the present invention;

Figure 6:
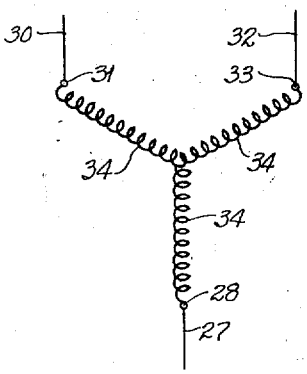
Figure 7:
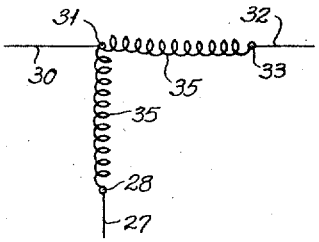
Figure 5:
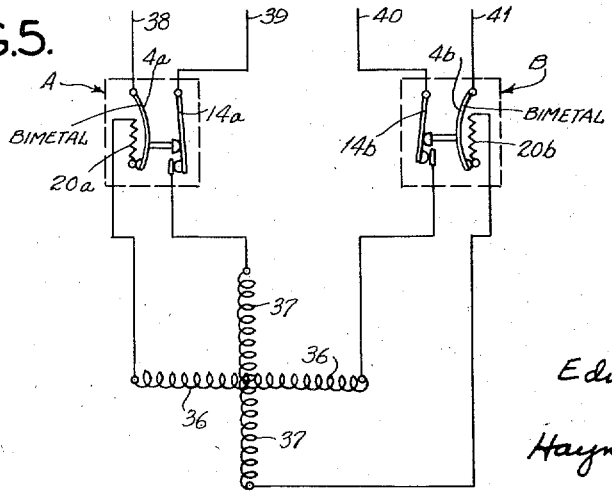

Figures 5, 6, and 7 are circuit diagrams illustrating alternative embodiments of the invention.

Similar reference characters indicate corresponding parts throughout the several views of the drawings.

For the sake of simplicity herein, the invention is described as it applies to a motor, but it will be obvious to anyone skilled in the art that the invention can be similarly and equally well applied to generators, transformers, electromagnets and other forms of energy-translating devices.

There is a growing tendency to use thermal-overload protectors in conjunction with electrical motors, which control the motor directly (without intervening relays or contactors) and are of such nature that they can be mounted directly in the motor by the motor manufacturer. In this way, the motor manufacturer can be assured that the overload-protection switches have the proper characteristics for the particular motor; and because the protector is responsive to the actual temperature of the motor, more accurate protective results can be obtained. One of the problems in this art has been the protection of polyphase motors in a simple and efficient manner.

It has sometimes been the practice heretofore, for example, on small three-phase motors, to use two protectors each comprising a single-pole switch, a thermally responsive element adapted to operate said switch, and a heater in series with said switch and thermally adjacent to said element; one such switch being connected in each of two terminal leads. Several forms of such protectors are described in detail in John D. Bolesky applications Serial Nos. 158,107 and 189,075, filed August 9, 1937, and February 7, 1938, respectively. Serial No. 158,107 has eventuated as patent 2,199,387, dated May 7, 1940, and Serial No. 189,075 has eventuated as Patent 2,199,388, dated May 7, 1940. But this method gives unsatisfactory performance for three-phase motors although it does serve to protect the motor. For example, unless the heating of the motor at the points of mounting of the two protectors is the same, unless the currents in the two terminal leads in which the protectors are mounted are exactly the same for the two protectors, and unless the characteristics of the two protectors are exactly the same, one will precede the other in functioning. Since absolutely uniform conditions are practically unknown in actual practice, this non-simultaneous functioning usually happens, and the motor consequently operates single phase until the other protector functions. The first protector to open will probably reclose first if it is of the self-resetting type and the motor will remain stalled as it cannot start on single phase. Thus it is likely that the heavy stalled current will again trip this protector before the second resets and the two will continue, on and off, until they accidentally fall into step long enough to restart the motor. This means indeterminable delay. To overcome this the manual-reset type of protector as shown in said patent application Serial No. 189,075 (Patent 2,199,388) may be used, but unless mechanical arrangements are provided so that a single push button operates both protectors, two buttons will have to be pushed each time, and, furthermore, manual-reset protectors cost considerably more than automatic reset types, and the majority of applications are better served by the automatic type. To meet these conditions it has heretofore sometimes been the practice to interlock mechanically two protectors so that they operate mechanically in unison, or at least so that one may not reset while the other remains open. But such mechanical interlocking, while giving the desired performance, is more costly than the type of protectors and method of connecting herein described. Also, there are various other disadvantages in the mechanical interlocking, as such protectors must be specially made for polyphase use, require greater skill in design and manufacture, and are naturally more complicated.

In the present invention, two thermal switches are used, each of which has a single-throw, double-pole switch actuated by a single thermal element, and the two switches are electrically connected in a circuit that accomplishes the above objects.

While it is not a part of the present invention, the construction of a switch which will satisfactorily accomplish the proper circuit operations, according to the invention, will first be described.

Figure 2:
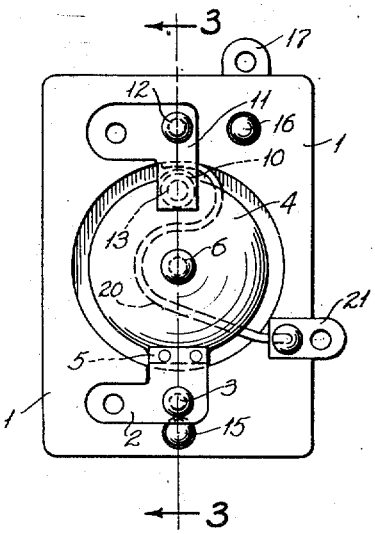
Fig. 2 is a top plan view of a thermally responsive switch.
Figure 3:
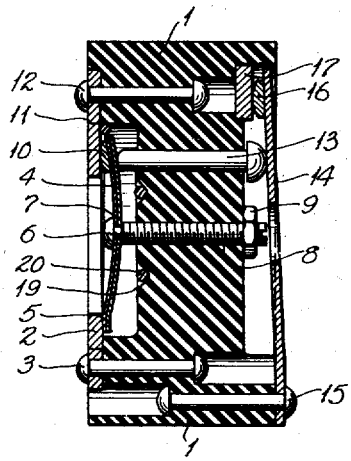
Fig. 3 is a cross section taken substantially along line 3—3 of Fig. 2.
Figure 4:
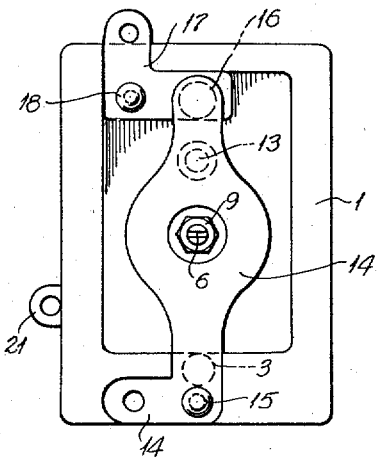
Fig. 4 is a bottom plan view of the switch of Fig. 2.

Referring to Figures 2, 3, and 4, numeral 1 indicates a base of electrical insulating material, upon which are mounted the various elements of the switch. A supporting plate 2 made of brass or steel or other electrical-conducting material is held on the base 1 by means of a rivet 3 passing therethrough. Suitably attached to supporting plate 2 at one end thereof by welding, riveting or any other suitable fastening, is a thermostatic disc 4 such as described and claimed in J. A. Spencer Patent 1,448,240, dated March 13, 1923. Disc 4 is shown electrically spot-welded to the supporting plate 2 by means of a tab 5 formed on the disc as an integral part thereof. A supporting and adjusting screw 6 is fastened to the center of the disc in a rotatable manner by means of proper shoulders and abutments as indicated at numeral 7, and, by engagement with a threaded hole 8 in the base 1, is used to adjust the operating temperatures of the element 4. A lock nut 9 is used to hold screw 6 from turning after the adjustments are made. Welded or otherwise suitably fastened to the diametrically opposite point on the disc from the tab 5 is a contact button 10. Button 10 makes good electrical connection with the disc 4. Cooperating with the button 10 is a contact plate 11 which is held firmly on the base 1 by means of a rivet 12.

Extending through base 1 in a sliable manner in a hole therethrough is a push rod 13 which is actuated by the motion of the thermal element 4, and which is made of an electrical insulating material such as "Bakelite." Push rod 13 in turn moves a switch arm 14 on the other side of the base. Switch arm 14 is made of spring steel or brass, or any other suitable electrical conducting material having the necessary resilient character. Switch arm 14 is mounted firmly at one end on the base by means of a rivet 15 passing therethrough. Fastened on the opposite or movable end of the switch arm 14 by welding or riveting so as to be in electrical connection therewith is an electrical contact button 16. Cooperating with movable contact button 16 is stationary contact plate 17 which is held securely to the base 1 by means of a rivet 18. Spring arm 14 is tensioned slightly to hold contacts 16 and 17 normally engaged. In a recess 19 provided in the base 1 is mounted a heater wire 20 adapted to heat the thermal element 4. One end of heater wire 20 is connected to contact plate 11 and the other end to a terminal plate 21. The purpose of the heater 20 is to offset the lag in temperature between the winding of the motor and the thermal element 4 when the winding temperature rises rapidly from excessive current as when the motor is stalled or very heavily overloaded.

Other details of the construction of the switch need not be recited herein. The operation of the switch is as follows:

If the disc 4 is heated either by increase in ambient temperature, or by the passage of electrical current through it and the electrical heater 20, or by a combination of these means, to a temperature sufficient to actuate it, it will snap its movable end and contact 10 to the right from the Fig. 3 position, for reasons indicated in the above-mentioned Spencer Patent 1,448,240. In doing so, the disc 4 breaks the electrical connection between movable contact 10 and stationary contact 11. At the same time, it also pushes to the right the insulating push rod 13, which in turn pushes the switch member 14 to the right, thus breaking the electrical connection between movable contact 16 and stationary contact 17. Thus, it is seen that the single thermally actuated element 4 actuates what is in effect a single-throw, double-pole switch.

Any other switch of suitable nature can be used in the circuits of the present invention.

Figure 1:
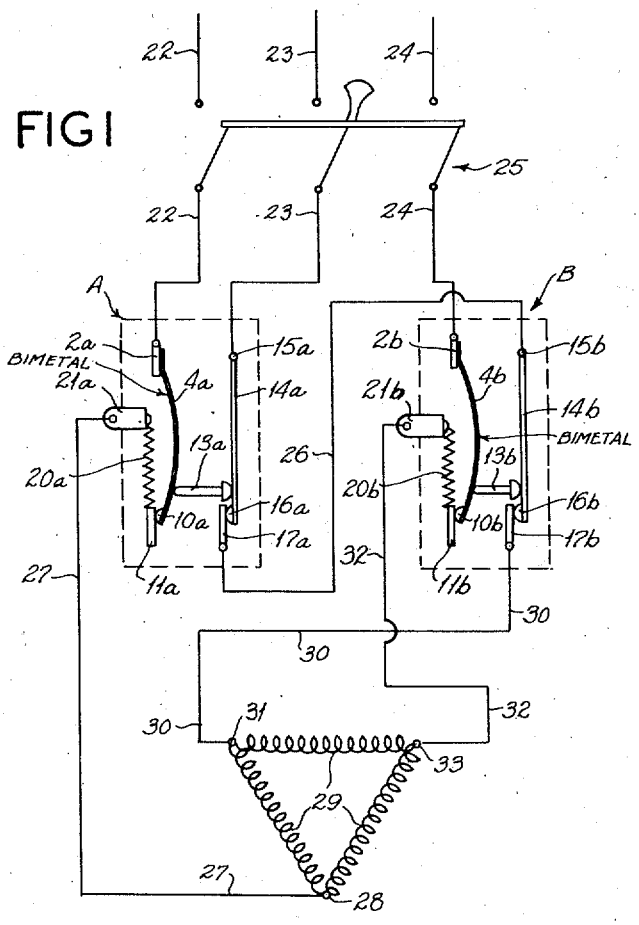

Referring now to Fig. 1, there is shown in schematic form a circuit embodying the present invention. Numerals 22, 23, and 24 each indicate the power leads of a polyphase source of electrical current supply. Indicated at numeral 25 is a line switch controlling the motor and representing either a manual or an automatic switch of the type commonly used to start and stop the motor. The two thermostatically actuated protector switches of the type heretofore described are indicated at letters A and B and comprise the discs shown schematically as at 4*a* and 4*b*, the switch arms shown schematically as at 14*a* and 14*b* with the contacts 10*a*, 11*a*, 16*a* and 17*a* in switch A, and 10*b*, 11*b*, 16*b*, and 17*b* in switch B.

Connections are made as follows:

Power lead 22 is connected to support plate 2*a*, power lead 23 is connected to switch arm 14*a* through plate 15*a*, and power lead 24 is connected to plate 2*b*. Contact plate 17*a* is connected by a wire 26 to switch arm 14*b* through plate 16*b*; terminal plate 21*a* is connected by a wire 27 to a terminal 28 of a motor winding 29; contact plate 17*b* is connected by a wire 30 to a terminal 31 of the motor winding 29; and terminal plate 21*b* is connected by a wire 32 to terminal 33 of the motor winding 29.

Considering the circuit connections for each of the motor winding terminals:

For terminal 28, current passes from the power supply through wire 22, thermostatic disc 4*a*, heater 20a, and wire 27. For terminal 33, current passes through power line 24, thermostatic disc 4b, heater 20b and wire 32. For terminal 31, current passes through power line 23, switch arm 14a, wire 26, switch arm 14b, and wire 30.

The operation of the protective circuit is as follows:

If the protectors are made to match the motor characteristics properly, and are properly mounted on or in the motor, the current traversing the heaters and discs plus the ambient temperature within the motor where the protectors are mounted will cause the discs to open when the maximum safe temperature for the motor winding is reached under any operating condition. It is not likely that the discs will function simultaneously, but either one on functioning interrupts two of the three wires 22, 23, and 24 supplying power, and hence either deenergizes the motor. Similarly, if both switches should cut out, the motor will not be re-energized until the last to reset does so, either automatically or manually depending upon the particular type of switch employed.

In Fig. 1 is shown a "delta" connected three-phase winding 29 for the motor or device protected. However, the circuit shown serves equally well if a three-phase, Y-connected winding 34 (Fig. 6) or a two-phase, three-wire winding 35 (Fig. 7) is substituted.

The principle of this invention can be equally well applied in other types of polyphase systems such as the two-phase, four-wire system shown in Fig. 5, in which one protector switch (A and B) is connected in series with each of two windings 36 and 37, with the extra pole of each switch (A and B) in series with the other winding 37 or 36, as shown in Fig. 5, numerals 3, 39, 40, and 41 indicating the four power lines.

Also referring to Fig. 1, the circuit is likewise operative if the switch pole represented by contacts 16a and 17a were connected in series in wire 32 and/or if the pole represented by contacts 16b and 17b were connected in series in wire 27. In fact, it is immaterial in what relationship the two switches are connected except that obviously the heaters 20a and 20b should not be in the same line.

While a heater 20a (or 20b) is desirable for most types of motors, it is not needed for some types of energy-translating devices, particularly those in which only gradual heating can occur.

One two-pole thermostatic switch used in a circuit of the type described will serve to protect three-wire polyphase devices when the heater is not required.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In combination with an electrical polyphase energy translating device having at least three power terminals, a protective circuit therefor including two automatically resetting double pole switches each having thermally responsive means for actuating it in accordance with the temperature of the device and current flowing in the circuit, and at least three power supply lines for the device, one of said lines being connected to one of said power terminals with one pole of one switch in series therewith, a second line being connected to a second power terminal with one pole of the other switch in series therewith, and the second pole of each of said switches being connected in one of the lines other than the line in which its respective first pole is connected.

2. A circuit as set forth in claim 1, including electrical heating means in each of the said switches adapted to affect their respective thermally responsive means in accordance with the electrical current passing through said heating means, the respective heating means for each switch being connected in series in one of the power lines connected through the switch it affects but not in the same power line with the other heating means.

3. A circuit as set forth in claim 1, including electrical heating means in each of the said switches adapted to affect their respective thermally responsive means in accordance with the electrical current passing through said heating means, the respective heating means for each switch being connected in series in one of the power lines controlled by that switch.

4. In combination with an electrical polyphase energy translating device having two windings with two power terminals each, a protective circuit therefor including two automatically resetting double pole single throw switches each having thermally responsive means for actuating it in accordance with the temperature of the device and current flowing in the circuit, and four power supply lines for the device, one of said power lines being connected to one terminal of the first winding with one pole of the first switch in series therewith, a second power line being connected to the other terminal of said first winding with one pole of the second switch in series therewith, a third power line being connected to one terminal of the second winding with the other pole of the first switch in series therewith, and the fourth power line being connected to the other terminal of the second winding with the other pole of the second switch in series therewith.

5. A circuit as set forth in claim 4, including electrical heating means in each of the said switches adapted to affect their respective thermally responsive means in accordance with the electrical current passing through said heating means, the respective heating means for each switch being connected in series in one of the power lines controlled by that switch.

6. In combination with an electrical polyphase energy-translating device having at least three power terminals, a protective circuit therefor including two automatically resetting double-pole switches each having thermally responsive means for actuating it in accordance with the temperature of the device and current flowing in the circuit, and at least three power supply lines for the device, one of said lines being connected to one of said power terminals with one pole of at least one switch in series therewith, a second line being connected to a second power terminal with one pole of the other switch in series therewith, and the second pole of each of said switches being connected in one of the lines other than the line in which its respective first pole is connected.

7. In combination with an electrical polyphase energy translating device having at least three power terminals, a protective circuit therefor including two automatically resetting double-pole switches, each of said switches including a first switch arm comprising a thermostatic element which is inherently self-heating upon passage of current therethrough and operatively coupled to a second switch arm, each of said switches being mounted in heat-exchange relation to the energy translating device, and at least three power lines for the device, one of said lines being connected to one of said power terminals with one arm of one of the switches in series therewith, a second line being connected to a second power terminal with one arm of the other switch in series therewith, a third power line being connected to a third power terminal with the remaining arms of two switches in series therewith.

8. In combination with an electrical polyphase energy translating device having at least three power terminals, a protective circuit therefor including two automatically resetting double-pole switches, each of said switches including a first switch arm comprising a thermostatic element which is inherently self-heating upon passage of current therethrough and operatively coupled to a second switch arm, each switch also including a heater positioned to heat its thermostatic element and connected to be energized when the switch is closed, both of said switches being mounted in heat-exchange relation to the energy translating device, and at least three power lines for the device, one of said lines being connected to one of said power terminals with one arm of one of the switches in series therewith, a second line being connected to a second power terminal with one arm of the other switch in series therewith, a third power line being connected to a third power terminal with the remaining arms of the switches in series therewith.

9. In combination with an electrical polyphase energy translating device having three power terminals, a protective circuit therefor including two automatically resetting double-pole switches, each switch including a first switch arm comprising an automatically resetting, snap-acting thermostatic disc which is inherently self-heating upon passage of current therethrough, and a second switch arm coupled to the disc for actuation thereby, each switch also including a heater positioned to heat its disc connected in series with the disc, both switches being mounted in heat exchange relation to the energy translating device, three power lines for the device, one of said lines having the said second switch arms of both of the switches in series therein, a second line having the disc and heater of one of said switches in series therein, and the third line having the disc and heater of the other switch in series therein.

EDWARD F. KURTZ.

REFERENCES CITED

The following references are of record in the file of this patent:

UNITED STATES PATENTS

| Number | Name | Date |
|---|---|---|
| 1,693,379 | Gano | Nov. 27, 1928 |
| 1,729,561 | Vaughan | Sept. 24, 1929 |
| 1,997,673 | Boothby | Apr. 16, 1935 |
| 2,063,981 | Brunner | Dec. 15, 1936 |
| 2,066,904 | Bartmess | Jan. 5, 1937 |